United States Patent [19]

Kameyama et al.

[11] 4,261,552
[45] Apr. 14, 1981

[54] CUTTING DEVICE FOR CONTINUOUS CASTERS

[75] Inventors: Kazuhide Kameyama, Kawachinagano; Hitoshi Tanno, Himeji, both of Japan

[73] Assignee: Nippon Steel Corporation, Tokyo, Japan

[21] Appl. No.: 46,777

[22] Filed: Jun. 8, 1979

[30] Foreign Application Priority Data

Jun. 9, 1978 [JP] Japan ................... 53-68919

[51] Int. Cl.³ .............. B23K 7/02; B22D 11/126
[52] U.S. Cl. ......................... 266/50; 83/318; 164/263; 266/69
[58] Field of Search ............ 164/263; 266/50, 902, 266/69; 83/15, 170, 318–320

[56] References Cited

U.S. PATENT DOCUMENTS

| 3,462,134 | 8/1969 | Michelson | 164/263 X |
| 3,497,195 | 2/1970 | Kalkhof | 164/263 X |
| 3,539,168 | 10/1970 | Pfeuffer | 164/263 X |
| 3,929,324 | 12/1975 | Lotz et al. | 164/263 X |
| 4,125,250 | 11/1978 | Herbener et al. | 266/50 |
| 4,143,860 | 3/1979 | Herbener et al. | 266/50 X |

FOREIGN PATENT DOCUMENTS

2710564  4/1978  Fed. Rep. of Germany ........... 164/263

Primary Examiner—Robert D. Baldwin
Assistant Examiner—J. Reed Batten, Jr.
Attorney, Agent, or Firm—Wenderoth, Lind & Ponack

[57] ABSTRACT

In a continuous-casting machine, a device for cutting a casting synchronously with the traveling speed of the casting is mounted above a conveyor table extending horizontally beyond casting withdrawal guide rollers. The cutting device has a temperature maintaining cover that covers the casting on the conveyor table, moving with the cutting device proper along the conveyor table.

13 Claims, 10 Drawing Figures

CUTTING DEVICE FOR CONTINUOUS CASTERS

BACKGROUND OF THE INVENTION

This invention relates to a casting cutting device for continuous casting machines. More particularly, it relates to a device for cutting a casting that is continuously withdrawn from a continuous casting machine, while maintaining the temperature of the casting.

Figure 1:
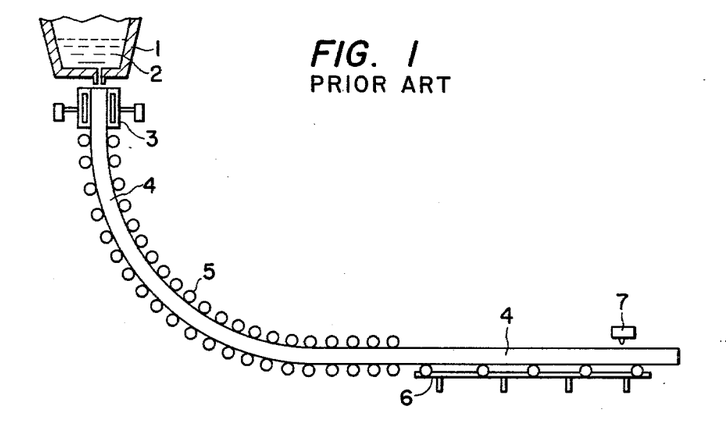
FIG. 1 is a schematic drawing of a common continuous-casting machine, including a conveyor table and a cutting device.

As shown in FIG. 1, a continuous caster generally casts molten steel 2 stored in a tundish 1 into a mold 3 where the steel is formed into a casting 4 of the desired shape. The casting 4 is continuously withdrawn through withdrawal guide rollers (hereinafter called guide rollers) 5 onto a horizontal conveyor table 6 following the guide rollers 5. A cutting device 7 mounted on the conveyor table 6 cuts the casting 4 into desired lengths.

The cutting device 7 is movable along and above the conveyor table 6 synchronously with the traveling speed of the casting 4, so that the cutting device 7 can cut the casting 4 continuously supplied onto the conveyor table 6 without interrupting the operation of the continuous caster.

Figure 2:
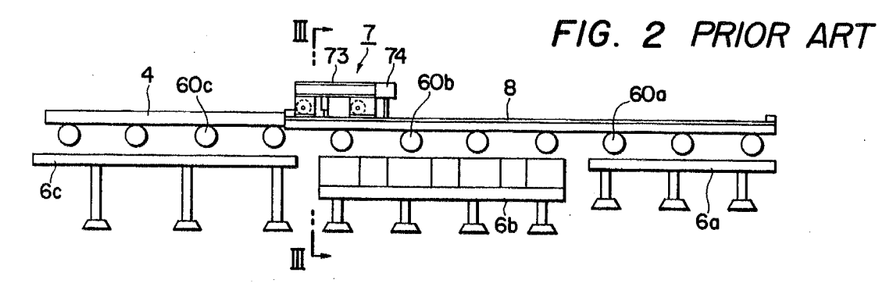
FIGS. 2 and 3 illustrate a conventional cutting device, FIG. 2 being a side elevation and FIG. 3 being a cross-sectional view taken along the line III—III of FIG. 2.
Figure 3:
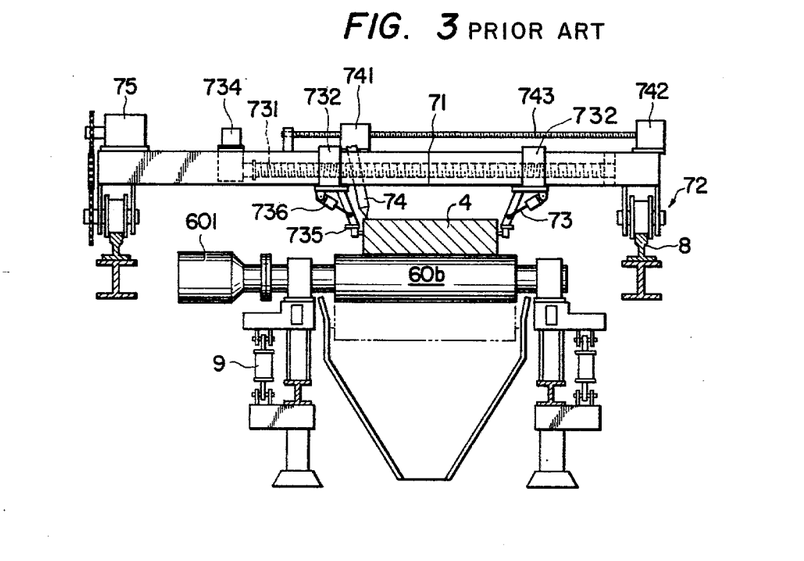

FIGS. 2 and 3 are a side elevation and a cross section of the conveyor table 6 and cutting device 7 of the conventional ordinary design. As illustrated, the conveyor table 6 comprises a forward conveyor table 6a, a rearward conveyor table 6c (the terms "forward" and "rearward" used herein designate relative positions in relation to the traveling direction of the casting 4), and a lifting roller table 6b. The cutting device 7 comprises a frame 71 straddling the conveyor table 6, runners 72 which movably support the frame 71 while running on rails 8 laid along and on either side of the conveyor table 6, a clamp mechanism 73 carried by the frame 71 so as to be movable across the width of the casting 4, and a flame cutting torch 74.

As shown in FIG. 3, the clamp mechanism 73 comprises a threaded bar 731 rotatably supported by and transversely extending along the frame 71 and a pair of clamp cars 732 engaged with the threaded bar 731. The threaded bar 731 is rotated by a motor 734 equipped with a reduction gear, whereby the clamp cars 732 move transversely. A transversely swingable clamp arm 735 is fitted to the bottom of each clamp car 732, and the rod of a swinging air cylinder 736 is connected to the clamp arm 735. The motor 734 rotates the threaded bar 731 to bring the clamp cars 732 close to both sides of the casting 4. Then, the air cylinders 736 are actuated to clamp the casting 4 with the clamp arms 735.

The flame cutting torch 74 is fastened to a transversely movable saddle 741 mounted on the frame 71, following the clamp mechanism 73. Engaged with a threaded bar 743 rotated by a motor 742 equipped with a reduction gear, the saddle 741 moves transversely during the rotation of the threaded bar 743. The saddle 741 moves at a constant speed so that the torch 74 advances from one side to the other to cut the casting 4 widthwise.

To cut the casting 4 with the cutting device 7, the clamp mechanism 73 clamps both sides of the casting 4 when the cutting point, which is spaced from the head end of the casting 4 by a desired length, passes below the cutting device 7 standing ready for operation in the starting position as shown in FIG. 2. The desired length is determined by a measuring device such as a measuring roll. When the clamping is accomplished, the cutting device 7 is synchronously moved forward by the casting 4, through the frame 71 and runner 72. At the same time, the torch 74 starts to cut the casting 4, using a hot flame. As the casting 4 travels forward, the torch 74 moves sideward to cut across the casting 4. On completion of the cut, the clamp mechanism 73 is released to stop the forward movement of the frame 71, and a drive motor 75 returns the cutting device 7 to its starting position, ready for the next cutting operation. Because the torch 74 is traversed at a constant speed, completion of the cut can be accomplished in the time elapsed since the start of the cut. Such operations as the stopping of the cutting, the release of the clamp mechanism, and the withdrawal of the cutting device 7 are automatically controlled by a sequence circuit (not shown) including a timer.

The cutting device 7 moves mainly over the lifting roller table 6b. When the casting 4 being flame-cut passes over the lifting roller table 6b from conveyor rollers 60c on table 6c to conveyor rollers 60a on table 6a, lifting conveyor rollers 60b provided thereon are lowered by an up-down mechanism 9, whereby the conveyor rollers 60b are protected from the chips from the cutting operation and the cutting flame.

The conventional practice has been that the casting 4, cut to the desired length by the cutting device 7, is cooled on cooling beds etc., cold-scarfed or stockpiled, then reheated in a heating furnace and delivered to the subsequent rolling-mill line. Solidification of the casting 4 has been completed by the time the casting 4 moves onto the conveyor table 6, clearing the guide rollers 5. On completion of the solidification, the casting 4 still has a high temperature of 1,000° C. or above. Accordingly, the conventional practice has called for costly installation and maintenance of the cooling equipment and heating furnace and, also, has involved considerable energy losses. To eliminate these shortcomings, several attempts have been made at so-called hot charging, which varies from delivering the as cut uncooled casting 4 direct into the rolling process to heating the casting 4 in a heating furnace to a temperature suited for the subsequent rolling operation. Because of the extensive temperature drop during the passage through the guide rollers 5 and over the conveyor table 6, however, the casting 4 has seldom maintained a sufficiently high temperature to permit direct rolling, entailing considerable heating in the heating furnace. Especially, cutting the casting 4 with a traversing torch takes a long time (e.g. 2 to 5 minutes), during which the casting temperature drops by 100° C. or more.

Some temperature-conserving devices have been proposed to prevent the temperature drop in the casting, too. In the vicinity of the conveyor table 6, however, the cutting device 7 moves back and forth frequently, as described previously. A dummy bar, which is inserted before the start of a cast, is removed. Scale and other foreign matter (hereinafter collectively called the scale) dropping from the traveling casting 4 are removed in this area, too. In addition, many conveyor rollers 60, a drive mechanism 601 therefor, and other equipment are provided in a limited space thereabout. Because of these difficulties, no simple, compact and effective temperature-maintaining equipment has been developed which as a practical matter can be installed in the limited space and surely prevent the temperature drop in the casting 4.

SUMMARY OF THE INVENTION

This invention has solved the aforementioned problems involved in the cutting of the casting manufactured on the continuous-casting machine.

An object of this invention is to provide a device for cutting castings, equipped with a temperature-maintaining cover, capable of cutting a casting, which is held at as high a temperature as possible, while moving therewith.

Another object of this invention is to provide a casting cutting device with a temperature-maintaining cover which is simple in structure and readily adaptable to existing continuous-casting equipment.

Yet another object of this invention is to provide a casting cutting device with a temperature-maintaining cover which is easy to maintain and inspect and adjustable to accommodate a change in the size of the casting.

To achieve the above objects, the casting cutting device according to this invention is mounted above a horizontal conveyor table following the withdrawal rollers of a continuous caster, and movable along the conveyor table so as to cut the casting synchronously with the traveling speed thereof, and is equipped with a temperature-maintaining cover that covers the casting on the conveyor table, moving therealong with the cutting device proper.

This cutting device cuts the traveling casting while moving therewith. During the time cut is being made, the moving temperature-maintaining cover continues to cover the casting, thus preventing the dissipation of heat therefrom. The casting thus cut to a desired length can be supplied to the subsequent process, such as rolling, without reheating.

DETAILED DESCRIPTION OF THE PREFERRED EMBODIMENTS

Figure 4:
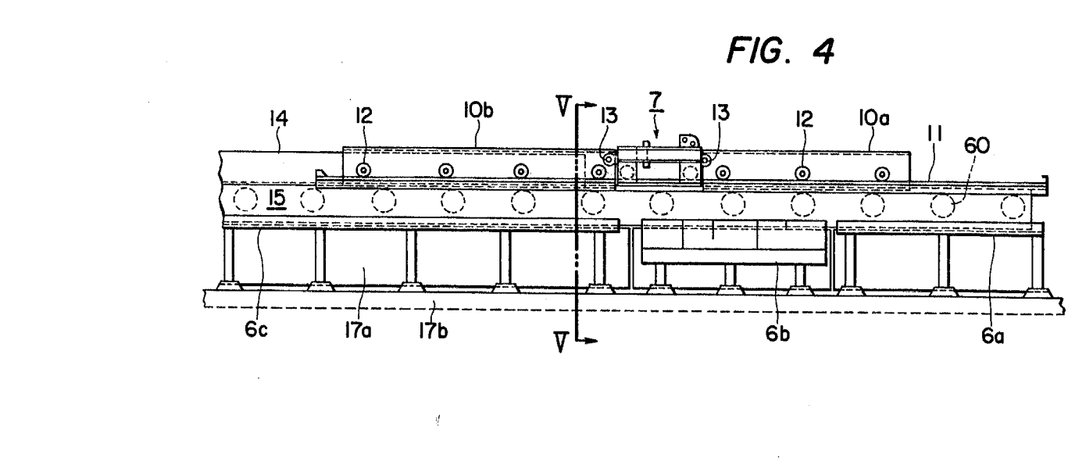
FIGS. 4 and 5 illustrate a cutting device with a temperature-maintaining cover according to this invention, FIG. 4 being a side elevation and FIG. 5 being a cross-sectional view taken along the line V—V of FIG. 4.
Figure 5:
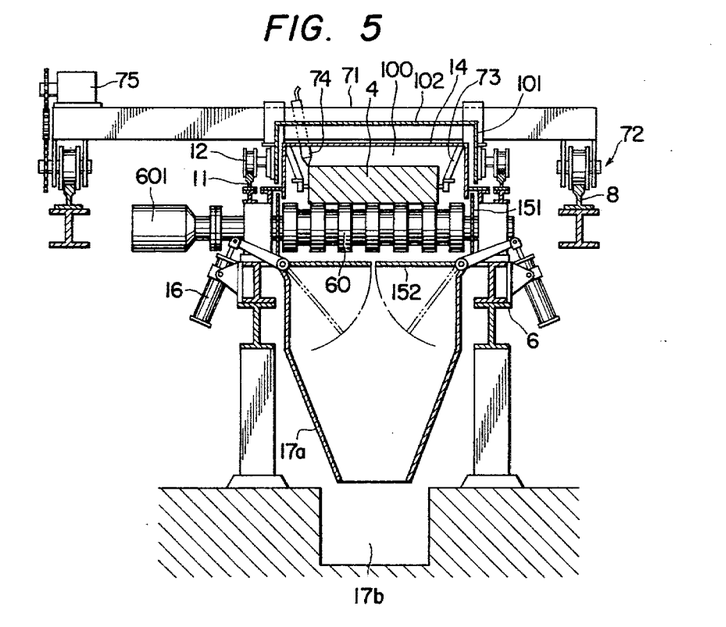

As seen in FIG. 4 and FIG. 5 the frame, runner, clamp mechanism and flame cutting torch (the main part comprising these items hereinafter will be collectively called the main body) in these drawings are similar to the counterparts in the conventional device shown in FIGS. 2 and 3. Therefore, they will be designated by similar reference characters and will not be described in detail. FIG. 5 shows a stationary rearward conveyor table 6c, but the cutting device according to this invention can also have a lifting roller table 6b as shown in FIG. 3.

In FIGS. 4 and 5, reference characters 10a and 10b respectively designate a forward temperature-maintaining cover and a rearward temperature-maintaining cover disposed on the front and rear sides of a frame 71 of a cutting device 7. (The forward and rearward temperature-maintaining covers 10a and 10b are often collectively called a temperature-maintaining cover 10). The temperature-maintaining cover 10 of this embodiment is channel-shaped in cross section, comprising side plates 101 and a top plate 102. The side plates 101 each carry a wheel 12 that runs on a rail 11 laid on each side of the conveyor rollers 60, along the conveyor table 6. The side plates 101 and top plate 102, fabricated in the shape of a channel, form a closed space 100, enclosing a casting 4, over the conveyor rollers 60, moving over the conveyor table 6 supported on the wheels 12. The temperature-maintaining cover 10 is detachably fastened to each of the front and rear ends of the frame 71 of the cutting device 7 with fasteners 13 such as hooks, bolts or shackles, so that the cover 10 moves back and forth over the conveyor table 6 during the travel of the cutting device proper 7. Detachably fastened to the frame 71, the temperature-maintaining cover 10 can be changed if the size of the casting 4 changes, and also facilitates the maintenance and inspection of the conveyor table 6 and auxiliary facilitates thereof.

The length of the temperature-maintaining cover 10 is such that the cover 10 can insure effective temperature maintenance, enclosing the casting 4 traveling over the conveyor table 6, not only while the cutting device 7 is inoperative but also while the cut is being made. More precisely, the forward temperature-maintaining cover 10a is given a length corresponding to the cut length of the casting 4, or a length that covers a distance between the head end of the casting 4 and that point thereof at which a clamp mechanism 73 engages the casting and the cutting device 7 starts traversing. The rearward temperature-maintaining cover 10b is given a length that is enough to secure the unbroken closed space 100 over the conveyor table 6 left behind the cutting device 7 traveling forward from the rearmost starting position to the terminal at which the cut is completed.

In the embodiment shown in FIGS. 4 and 5, the length of the rearward temperature-maintaining cover 10b is minimized to reduce the resistance to the movement thereof. To insure the above-described function, a detachable stationary temperature-maintaining cover 14 is mounted over the rearward conveyor table 6c which does not interfere with the travel of the cutting device 7. The rearward temperature-maintaining cover 10b covers the stationary cover 14. When the cutting device 7 rests in the rearmost or starting position, the rearward temperature-maintaining cover 10b covers substantially the entire length of the stationary cover 14 as shown in FIG. 4. Then, the rearward temperature-maintaining cover 10b is drawn forward by the advancing cutting device 7. When the cutting device 7 has reached the farthest forward position at which the cut is completed, the rear end of the cover 10b still overlaps, to some extent, or contacts the stationary cover 14. A stationary cover may be provided beyond the cutting device 7 to maintain the temperature of the cut-off casting, too.

To achieve effective heat conservation, the movable and stationary covers 10 and 14 are lined with a heat-insulating material on the inside. Considering the movement and replacement of the temperature-maintaining covers, such light-weight, high-performance heat insulators as ceramic fibers are preferred. For example, the covers are lined with ceramic fibers to a thickness of 50 mm.

In this embodiment, a channel-shaped, lower temperature-maintaining cover 15, made of side plates 151 and bottom plates 152, is fixed to the conveyor table 6 below the conveyor rollers 60. In conjunction with the movable cover 10 and/or the stationary cover 14, the lower cover 15 encloses the conveyor rollers 60. The bottom plates 152 can be opened and closed by power cylinders 16. Accordingly, this embodiment can maintain the temperature of the casting 4 more effectively. Further, the scale dropping from the traveling casting 4 onto the bottom plate 152 can be disposed of easily by actuating the power cylinders 16 to open the bottom plates 152 as indicated by a double-dot-dash line in FIG. 5, whereupon the scale falls by gravity through a hopper chute 17a to a scale disposal ditch 17b.

Figure 6:
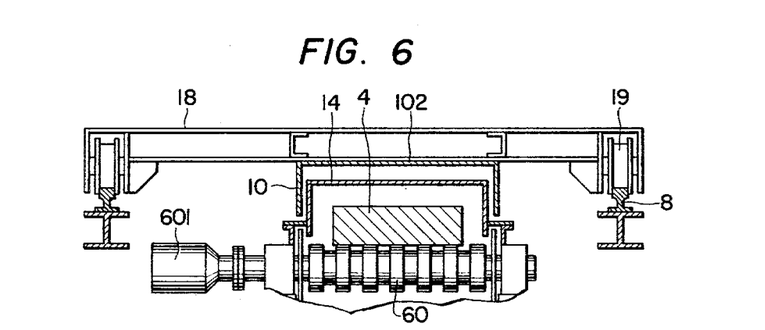
FIG. 6 is a cross-sectional view showing the temperature-maintaining cover of another embodiment of this invention.

FIG. 6 is a cross-sectional view of another embodiment of the temperature-maintaining cover 10. This temperature-maintaining cover 10 comprises a top plate 102 fastened to a cross beam 18. In this way, the cross beam 18 supports the cover 10. Each end of the cross beam 18 carries a wheel 19 that runs along the same rail 8 on which the runner 72 of the cutting device 7 runs. This embodiment permits using the same rail 8 for both the cutting device runner 72 and the cross beam wheel 19, thus leaving ample space in the vicinity of the conveyor rollers 60. This arrangement facilitates the maintenance and inspection of the conveyor rollers 60 and other equipment.

In the above-described embodiments, the cutting device 7 and temperature-maintaining cover 10 are moved forward, during the flame cutting operation, by the traveling casting 4 to which the cutting device 7 is clamped. They are returned to the starting position by the drive 75 connected to the cutting device 7. But they may be advanced and returned by other means as long as the advance during the flame cutting is synchronized with the travel of the casting 4 and the return is accomplished within a given time. For example, the cutting device 7 may be moved by controlling the operation of the drive 75 connected thereto so as to synchronize with the traveling speed of the casting 4 being cut.

Figure 7:
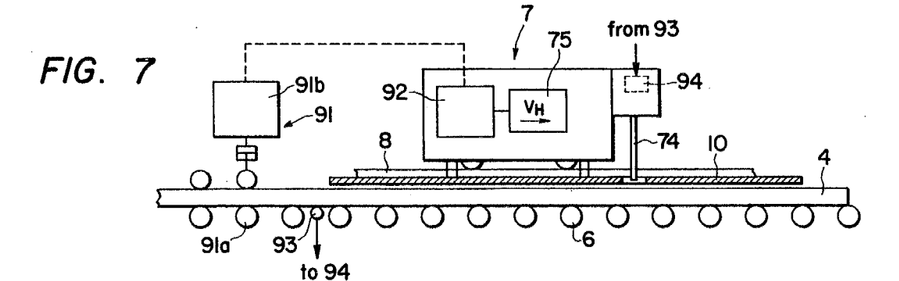
FIG. 7 is a schematic block diagram of yet another embodiment of this invention that has a device for driving the cutting device frame.

FIG. 7 shows an example of the above-described type, which has a speed meter 91 to measure the traveling speed of the casting 4 and a length measuring means 93 to determine the traveling distance thereof, both mounted on the rearward conveyor table 6c. The speed meter 91 comprises pinch rolls 91a, holding the casting 4 therebetween, and a tachometergenerator 91b connected thereto. The length measuring means 93 comprises a measuring roll. There is no clamp mechanism 73; instead the cutting device 7 is moved by the drive 75, independent of the casting 4. The drive 75 is controlled by the signal transmitted from the speed meter 91 to a control 92, whereby the cutting device 7 advances at the same speed as the casting 4. Fastened to the frame of the cutting device 7, the temperature-maintaining cover 10 moves therewith. The signal from the length measuring means 93 is supplied to a control 94 for the torch 74 to start a cut.

The temperature-maintaining cover 10 need not always be moved by the cutting device 7, but may be self-propelled. Then, each cover carries an individual drive the operation of which is synchronized with the traveling speed of the casting 4 or the cutting device 7.

Figure 8:
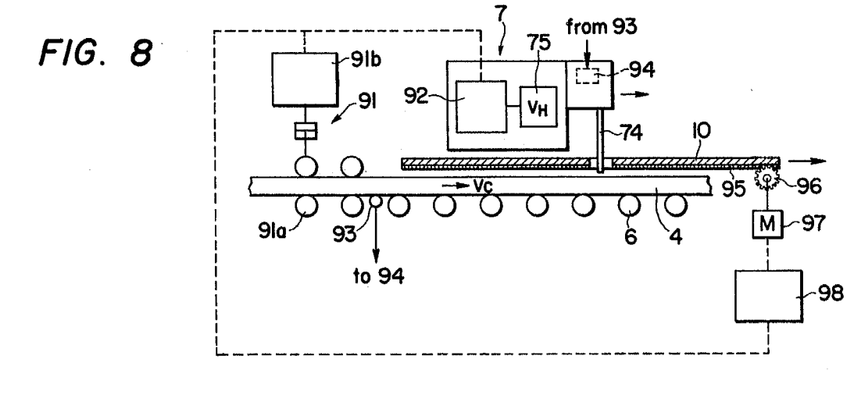
FIG. 8 is a schematic block diagram of still another embodiment of this invention that has a device for driving the temperature-maintaining cover.

FIG. 8 shows an example of the above-described type, wherein the cutting device 7 is driven in the same way as in FIG. 7, but the temperature-maintaining cover 10 is not fastened to the frame of the cutting device 7. The cover 10 is moved by a rack 95 provided thereon and a pinion 96 that engages with the rack 95 and which is driven by a motor 97. The speed of the motor 97 is controlled by a control 98 to which the signal from the speed meter 91 is supplied, so that the cover 10 advances at the same speed as the casting 4.

Since they have no clamp mechanism, the embodiments of FIGS. 7 and 8 need no opening to pass the clamp mechanism through the temperature-maintaining cover. This eliminates the dissipation of heat from the opening, and results in more effective heat conservation.

Figure 9:
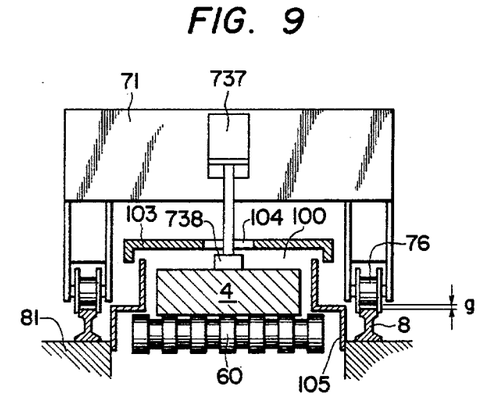
FIG. 9 is a cross-sectional view of another example of the clamp mechanism in the cutting device.

FIG. 9 shows another embodiment of the clamp mechanism provided with the cutting device 7. Like the embodiment of FIG. 5, the frame 71 of the cutting device 7 carries wheels 76 to run along the rails 8. An air cylinder 737 is fastened to the center of the frame 71, and a pressure head 738 is fixed to the free lower end of the rod of the air cylinder 737.

Stationary temperature-maintaining side walls 105 are fastened to a stand 81, close to each side of the casting 4 on the conveyor rollers 60. A substantially flat, movable temperature-conserving cover 103 is provided right above the stationary side walls 105 so as to form a closed space 100 in conjunction therewith. Although fastened to the frame 71 in this embodiment, the movable cover 103 may also be self-propelled by an individual drive, as with the embodiment of FIG. 8.

With the rod passing through an opening 104 in the movable cover 103, the pressure head 738 is moved up and down by the action of the air cylinder 737. Before the start of a cut, the head 738 descends to hold the casting 4 against the conveyor rollers 60. Then, the rod of the air cylinder 737 extends to such an extent that a gap g is left between the wheels 76 and the rails 8. Therefore, the frame 71 rests on the casting 4, together with a cutting nozzle (not shown) etc. Consequently, the cutting device proper 7 moves forward with the casting 4 being cut.

When the casting 4 has been cut, the head 738 is drawn up, whereupon the cutting device proper 7 descends to bring the wheel 76 into contact with the rail 8. Then, the cutting device 7 is returned by a drive (not shown) to its starting position.

Being substantially flat, the movable cover 103 of this embodiment is small and light. Because the head 738 needs only a small opening 104 to pass through, this embodiment suffers from less dissipation of heat than the one with the clamp mechanism shown in FIG. 5.

Figure 10:
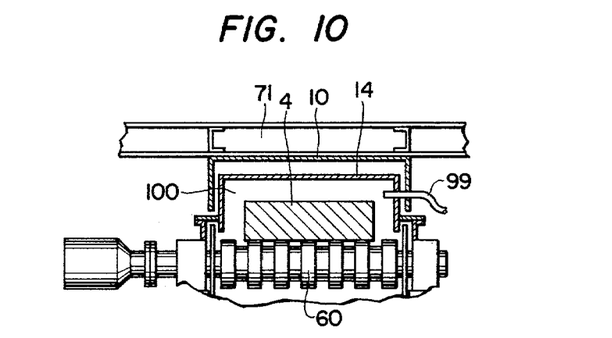
FIG. 10 is a cross-sectional view showing a temperature-maintaining cover equipped with an auxiliary heater.

FIG. 10 shows yet another embodiment of this invention, in which the closed space 100 in the temperature-maintaining cover 10 is heated by an auxiliary burner 99. The heating device is not limited to a burner. For example, an induction heating coil may be provided in the wall of the temperature-maintaining cover 10. This heating is only subsidiary; intended to attain a uniform temperature distribution throughout the casting 4. Therefore, not much heat is needed.

In the above-described embodiments, the flame cutting torch is used for cutting the casting. But the device of this invention is not limited thereto. For example, a sawing unit or a laser cutter may be attached to a cutting head adapted to travel across the casting. Also, the shape of the temperature-maintaining cover need not be limited to the ones used in the foregoing embodiments. For example, a simple flat plate may be placed over the casting if up-right side walls can be erected close to both sides thereof.

As evident from the above description, this invention provides a temperature-maintaining cover 10 in association with the cutting device 7, and moves the cover 10 and cutting device 7 synchronously with the travel of the casting 4. Even during the cutting operation, the cover 10 encloses the casting 4, thereby insuring effective temperature maintenance. This permits keeping the cut casting 4, ready for delivery to the subsequent process, at a remarkably high temperature.

For example, an embodiment of this invention shown in FIGS. 4 and 5 decreased the temperature drop in the casting 4, traveling over the conveyor table 6, by 90° to 120° C. Another embodiment applied to a continuous-casting machine the guide rollers 5 of which were provided with a temperature conserving device kept the casting 4, clearing the conveyor table 6, at high temperatures of 1,260° to 1,320° C. The latter case showed the feasibility of supplying the casting 4 directly into the rolling process, or of the so-called direct-charge rolling. As established by these examples, this invention can be applied particularly effectively to the curved-mold type continuous caster intended for direct-charge rolling.

What is claimed is:

1. In a device for continuous casting, the combination comprising: a horizontal conveyor table to receive a continuously cast slab; a movable frame mounted over and along said horizontal conveyor table, said frame being movable along the conveyor table in the direction of the movement of the cast slab; a cutting head carried by said frame for traversing the width of the cast slab for cutting sections therefrom; a forward and a rearward temperature-maintaining cover means extending along said conveyor table forwardly of and rearwardly of said frame, respectively, said cover means having respective lengths at least as long as the distance the slab travels during the period from the start to the finish of cutting, and extending over at least the top surface and both sides of the cast slab, said cover means being movable along the conveyor table for covering the casting traveling thereover; and means connected to said frame and said cover means for moving said frame and said cover means synchronously and at the same speed and in the same direction as the direction of movement of said cast slab for the time necessary for said cutting head to traverse the width of said cast slab and for then returning said frame and said cover means to the start position.

2. The combination as claimed in claim 1 wherein the forwardly and rearwardly extending temperature-maintaining cover means are detachably fastened to the front and rear ends of said frame, and said moving means comprises means for moving said frame.

3. The combination as claimed in claim 2 further comprising rails extending along and on both sides of said conveyor table, said temperature-maintaining cover means being movably supported on said rails.

4. The combination as claimed in claim 1 further comprising rails extending along and on both sides of said conveyor table and a cross beam movably mounted on said rails for movement therealong and supporting said frame, said temperature-maintaining cover means being mounted on said cross beam for movement therewith, and said moving means comprising means for moving said frame.

5. The combination as claimed in claim 1 wherein said cover means comprises covers extending over the top and both side surfaces of said cast slab and bottom plates directly below said conveyor table, a hopper chute positioned below said table and having an upper opening, said bottom plates being openably and closably mounted for discharging scale into said upper opening of said hopper chute.

6. The combination as claimed in claim 1 further comprising a stationary temperature-maintaining cover extending along said conveyor table for covering the cast slab on said conveyor table ahead of the start position of said frame, said rearwardly extending temperature-maintaining cover means extending over said stationary temperature-maintaining cover.

7. The combination as claimed in claim 1 wherein said temperature-maintaining cover means are lined on the inside with a ceramic fiber based heat insulating material.

8. The combination as claimed in claim 1 wherein both said cover means are connected to said frame and said moving means comprises: a drive means connected to said frame to move said frame along said conveyor table; means connected to said drive means for controlling the speed of said drive means; and means along said conveyor table for measuring the speed of movement of the cast slab and transmitting a speed signal based thereon to the speed controlling means for controlling the speed of said drive means to drive said frame at the same speed as the speed of the cast slab.

9. The combination as claimed in claim 1 wherein said frame and said cover means are movable along said conveyor table independently of each other and said moving means comprises: a frame drive means connected to said frame to move said frame along said conveyor table; a cover driving means connected to said cover means for driving said cover means; means connected to said frame drive means and said cover drive means for controlling the speed of said frame drive means; and means along said conveyor table for measuring the speed of movement of the cast slab and transmitting a speed signal based thereon to said speed controlling means for controlling the speed of the respective drive means to drive said frame and said cover means at the same speed as the speed of the cast slab.

10. The combination as claimed in claim 1 wherein said temperature-maintaining cover means are connected to said frame, and said moving means comprises a clamp mechanism supported on said frame for clamping the cast slab whereby the frame and said cover means are moved at the same speed as said cast slab.

11. The combination as claimed in claim 10 wherein said clamp mechanism comprises: a pair of clamp arms swingably supported on said frame on opposite sides of the cast slab for grasping the cast slab on the conveyor table from the opposite sides thereof; and fluid operated piston-cylinder devices mounted on said frame and connected to said clamp arms for swinging said clamp arms.

12. The combination as claimed in claim 10 wherein said clamp mechanism comprises: a fluid operated piston-cylinder device mounted on said frame and having a piston rod extending therefrom; and a push head attached to the free end of said piston rod and directed downwardly for engaging the cast slab and raising said frame and supporting it on said slab.

13. The combination as claimed in claim 1 further comprising temperature-maintaining means attached to said temperature-maintaining cover means.

* * * * *